US012634971B2

(12) United States Patent
Zheng et al.

(10) Patent No.: US 12,634,971 B2
(45) Date of Patent: May 19, 2026

(54) METHOD FOR APERIODIC POSITIONING REFERENCE SIGNAL TRANSMISSION

(71) Applicant: ZTE Corporation, Shenzhen (CN)

(72) Inventors: Guozeng Zheng, Shenzhen (CN);
Chuangxin Jiang, Shenzhen (CN);
Huahua Xiao, Shenzhen (CN);
Zhaohua Lu, Shenzhen (CN)

(73) Assignee: ZTE CORPORATION, Shenzhen
(CN)

(*) Notice: Subject to any disclaimer, the term of this
patent is extended or adjusted under 35
U.S.C. 154(b) by 253 days.

(21) Appl. No.: 17/853,350

(22) Filed: Jun. 29, 2022

(65) Prior Publication Data

US 2022/0330229 A1     Oct. 13, 2022

Related U.S. Application Data

(63) Continuation of application No.
PCT/CN2020/102117, filed on Jul. 15, 2020.

(51) Int. Cl.
*H04W 72/51* (2023.01)
*H04L 5/00* (2006.01)
*H04W 72/0446* (2023.01)
*H04W 72/0453* (2023.01)
*H04W 72/23* (2023.01)

(52) U.S. Cl.
CPC ........... *H04W 72/51* (2023.01); *H04L 5/0051*
(2013.01); *H04W 72/0446* (2013.01); *H04W
72/0453* (2013.01); *H04W 72/23* (2023.01)

(58) Field of Classification Search
CPC ............. H04W 72/51; H04W 72/0446; H04W
72/0453; H04W 72/23; H04L 5/0051;
H04L 5/0023; H04L 5/0091; H04L
27/261; H04L 5/0048; G01S 1/0428
See application file for complete search history.

(56) References Cited

U.S. PATENT DOCUMENTS

| | | | |
|---|---|---|---|
| 10,111,213 B2* | 10/2018 | Lee ........................ | H04W 72/21 |
| 2017/0171857 A1 | 6/2017 | Lee et al. | |
| 2023/0047646 A1* | 2/2023 | Manolakos ........... | H04W 72/23 |

FOREIGN PATENT DOCUMENTS

| | | |
|---|---|---|
| CN | 107360617 A | 11/2017 |
| CN | 109478971 A | 3/2019 |
| CN | 110719148 A | 1/2020 |
| WO | WO 2020/027604 A1 | 2/2020 |

(Continued)

OTHER PUBLICATIONS

Si et al. (CN 110719148 A) Translated (Year: 2020).*

(Continued)

*Primary Examiner* — Yemane Mesfin
*Assistant Examiner* — Jia Hao Deng
(74) *Attorney, Agent, or Firm* — Crowell & Moring LLP

(57) ABSTRACT

A wireless communication method for use in a wireless terminal is disclosed. The wireless communication method comprises receiving, from a network entity, a terminal configuration associated with an aperiodic positioning reference signal (PRS), receiving, from a serving node of the wireless terminal, downlink control information (DCI) of triggering at least one of the aperiodic PRSs, and receiving the at least one of the aperiodic PRSs based on the received DCI and the terminal configuration.

18 Claims, 6 Drawing Sheets

(56) References Cited

FOREIGN PATENT DOCUMENTS

WO    WO 2020/091545 A1    5/2020

OTHER PUBLICATIONS

Extended European Search Report received for Application No. EP 209450832 dated Nov. 22, 2022 (8 pages).
Huawei et al., "DL RS design for NR positioning", 3GPP Draft; RI-1906052, 3rd Generation Partnership Project (3GPP), Mobile Competence Centre ; 650, Route Des Lucioles ; F-06921 Sophia-Antipolis Cedex; France, vol. RAN WGI, No. Reno, USA; May 13, 2019-May 17, 2019 (7 pp.).
ATT: "Discussion of NR positioning Enhancements", 3GPP Draft; RI-2003642, 3rd Generation Partnership Project (3gpp), Mobile Competence Centre ; 650, Route Des Lucioles ; F-06921 Sophia-Antipolis Cedex ; France, vol. RAN WGI, No. e-meeting; 20200525 (18 pp.).
International Search Report and Written Opinion received for Application No. PCT/CN2020/102117 mailed Apr. 15, 2021 (7 pages).
CATT. "Discussion of NR positioning enhancements" *3GPP TSG RAN WG1 Meeting #101 R1-2003642*, Jun. 5, 2020 (18 pages).
Huawei et al. "Discussion of positioning enhancement" *3GPP TSG RAN WG1 Meeting #101-eR1-2003297*, Jun. 5, 2020 (9 pages).
Communication for EP Patent Application No. 20 945 083.2 dated Jul. 9, 2025 (5 pp.).
Office Action issued for China Patent Application No. 202080104794X dated Jun. 11, 2025 (with English translation) (20 pp.).
English Translation of Office Action for China Patent Application No. 202080104794.X dated March 14, 2025 (9 pp.).
Offlce Action for China Patent Application No. 202080104794.X dated Mar. 14, 2025 (with English translation) (11 pp.).
Office Action for China Patent Application No. 202080104794.X dated Aug. 28, 2024 (with English translation) (26 pp.).

* cited by examiner

| DCI field of triggering aperiodic DL PRS | First bit | Second bit | Third bit | Fourth bit |
|---|---|---|---|---|

| Frequency layer ID information 1 | First node ID information | Second node ID information | ... |
|---|---|---|---|

| Frequency layer ID information 2 | First node ID information | Second node ID information | ... |
|---|---|---|---|

Serving node

Serving node

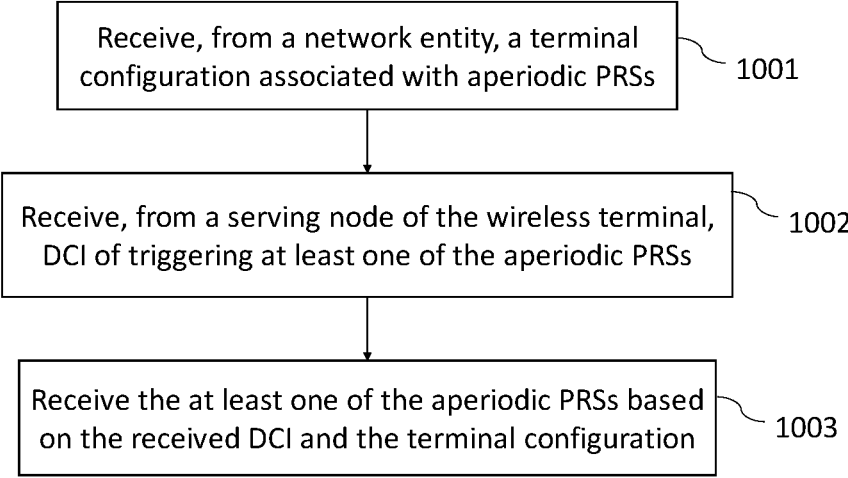

Receive, from a network entity, a terminal configuration associated with aperiodic PRSs 1001

Receive, from a serving node of the wireless terminal, DCI of triggering at least one of the aperiodic PRSs 1002

Receive the at least one of the aperiodic PRSs based on the received DCI and the terminal configuration 1003

FIG. 10

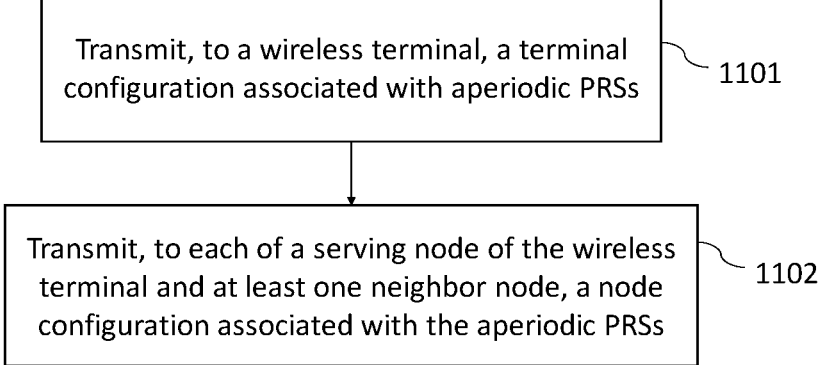

Transmit, to a wireless terminal, a terminal configuration associated with aperiodic PRSs 1101

Transmit, to each of a serving node of the wireless terminal and at least one neighbor node, a node configuration associated with the aperiodic PRSs 1102

FIG. 11

METHOD FOR APERIODIC POSITIONING REFERENCE SIGNAL TRANSMISSION

PRIORITY

This application claims priority as a Continuation of PCT/CN2020/102117, filed on Jul. 15, 2020, entitled "METHOD FOR APERIODIC POSITIONING REFERENCE SIGNAL TRANSMISSION", published as WO 2022/011597 A1, the entirety of which is incorporated herein by reference.

TECHNICAL FIELD

This document is directed generally to wireless communications.

BACKGROUND

In existing 5th generation (5G) new radio (NR) systems, a downlink positioning reference signal (DL PRS) only supports periodical transmissions, resulting in certain disadvantages. For example, the DL PRS only supporting periodical transmissions is not power and resource efficiency friendly and cannot adapt to mobility user equipment (UE). In addition, quasi co-location (QCL) information cannot be dynamically updated, leading to increasing in communication failures. Moreover, using the DL PRS it is difficult to meet temporary requirements of the UE, e.g. low latency positioning or instant higher positioning accuracy.

SUMMARY

Therefore, it is to be discussed how to improve the disadvantage caused by the DL PRS only supporting periodical transmissions.

This document relates to methods, systems, and devices for transmitting aperiodic positioning reference signal(s).

The present disclosure relates to a wireless communication method for use in a wireless terminal. The wireless communication method comprises:

receiving, from a network entity, a terminal configuration associated with aperiodic positioning reference signals, PRSs, receiving, from a serving node of the wireless terminal, downlink control information, DCI, of triggering at least one of the aperiodic PRSs, and receiving the at least one of the aperiodic PRSs based on the received DCI and the terminal configuration associated with the aperiodic PRS.

Various embodiments may implement the following features:

In some embodiments, the terminal configuration associated with each of the aperiodic PRSs comprises at least one of a trigger state identification, ID, frequency layer ID, node ID information, a PRS resource set ID or a PRS resource ID.

In some embodiments, the terminal configuration is received via the serving node of the wireless terminal.

In some embodiments, the terminal configuration is transparent to the serving node.

In some embodiments, the wireless communication method further comprises transmitting, to the network entity or the serving node, a request command for the aperiodic PRS.

In some embodiments, the request command comprises at least one of frequency information of the aperiodic PRS, node ID information, periodicity information indicating the aperiodic PRS or beam information of the aperiodic PRS.

In some embodiments, the DCI comprises a field of triggering the at least one of the aperiodic PRSs, wherein the field indicates at least one of trigger state ID information, frequency layer ID information, node ID information, resource set ID information, resource ID information, transmission offset information, path loss reference information or quasi-co-location information.

In some embodiments, at least one time of receiving the at least one of the aperiodic PRSs is determined based on a time of receiving the DCI of triggering the at least one of the aperiodic PRSs and at least one PRS offset corresponding the at least one of the aperiodic PRSs.

In some embodiments, the time of receiving the PRS transmitted by the serving node out of the at least one of the aperiodic PRSs is after the time of receiving the DCI of triggering the at least one of the aperiodic PRSs plus the PRS offset corresponding to the PRS transmitted by the serving node out of the at least one of the aperiodic PRSs.

In some embodiments, the time of receiving the PRS transmitted by a neighbor node out of the at least one of the aperiodic PRSs is after a time of virtual DCI plus the PRS offset corresponding to the PRS transmitted by the neighbor node out of the at least one of the aperiodic PRSs, wherein the time of the virtual DCI is determined based on the time of receiving the DCI of triggering the at least one of the aperiodic PRSs and at least one of a subframe offset or a system frame number offset between the serving node and the neighbor node.

In some embodiments, the at least one of the aperiodic PRSs is received within at least one measurement gap in at least one measurement gap repetition period.

In some embodiments, a time gap between a time of receiving the DCI and a time associated with the earliest PRS of the at least one of the aperiodic PRSs triggered by the DCI is greater than or equal to a threshold.

In some embodiments, the time associated with the earliest one of the at least one of the aperiodic PRSs triggered by the DCI is selected, based on a capability of the wireless terminal, from one of a starting time of a measurement gap in which the earliest PRS of the at least one of the aperiodic PRSs triggered by the DCI is located or a time of receiving the earliest PRS of the at least one of the aperiodic PRSs triggered by the DCI.

The present disclosure relates to a wireless communication method for use in a network entity, the wireless communication method comprising:

transmitting, to a wireless terminal, a terminal configuration associated with aperiodic positioning reference signals, PRSs, and transmitting, to each of a serving node of the wireless terminal and at least one neighbor node, a node configuration associated with the aperiodic PRSs.

Various embodiments may implement the following features:

In some embodiments, at least one of the terminal configuration or the node configuration associated with each of the aperiodic PRSs comprises at least one of a trigger state identification, ID, frequency layer ID, node ID information, a PRS resource set ID or a PRS resource ID.

In some embodiments, the terminal configuration is transmitted via the serving node of the wireless terminal.

In some embodiments, the terminal configuration is transparent to the serving node.

In some embodiments, the wireless communication method further comprises receiving, from the wireless terminal, a request command for the aperiodic PRS, and transmitting, to the serving node of the wireless terminal, information associated with at least one of the aperiodic PRSs for the wireless terminal.

In some embodiments, the wireless communication method further comprises transmitting, to the serving node, a request command for the aperiodic PRS.

In some embodiments, the request command comprises at least one of frequency information of the aperiodic PRS, node ID information, periodicity information indicating the aperiodic PRS or beam information of the aperiodic PRS.

The present disclosure relates to a wireless communication method for use in a serving node. The wireless communication method comprises:

receiving, from a network entity, a node configuration associated with aperiodic positioning reference signals, PRSs, and transmitting, to a wireless terminal, downlink control information, DCI, of triggering at least one of the aperiodic PRSs.

Various embodiments may implement the following features:

In some embodiments, the node configuration associated with each of the aperiodic PRS comprises at least one of a trigger state identification, ID, frequency layer ID, node ID information, a PRS resource set ID or a PRS resource ID.

In some embodiments, the DCI comprises a field of triggering the at least one of the aperiodic PRSs, wherein the field indicates at least one of trigger state ID information, frequency layer ID information, node ID information, resource set ID information, resource ID information, transmission offset information, path loss reference information or quasi-co-location information.

In some embodiments, the wireless communication method further comprises receiving, from the network entity, a terminal configuration of the aperiodic PRSs associated with the wireless terminal, and transmitting, to the wireless terminal, the terminal configuration.

In some embodiments, the terminal configuration is transparent to the serving node.

In some embodiments, the wireless communication method further comprises receiving, from the wireless terminal or the network entity, a request command for the aperiodic PRS.

In some embodiments, the request command comprises at least one of frequency information of the aperiodic PRS, node ID information, periodicity information indicating the aperiodic PRS or beam information of the aperiodic PRS.

In some embodiments, the wireless communication method further comprises receiving, from the network entity, information associated with the at least one of the aperiodic PRSs.

In some embodiments, the wireless communication method further comprises transmitting, to at least one neighbor node, information associated with at least one PRS transmitted by the at least one neighbor node out of the at least one of the aperiodic PRSs.

The present disclosure relates to a wireless terminal. The wireless terminal comprises a communication unit, configured to:

receive, from a network entity, a terminal configuration associated with aperiodic positioning reference signals, PRSs, receive, from a serving node of the wireless terminal, downlink control information, DCI, of triggering at least one of the aperiodic PRSs, and receive the at least one of the aperiodic PRSs based on the received DCI and the terminal configuration associated with the aperiodic PRSs.

Various embodiments may implement the following feature:

In some embodiments, the wireless terminal further comprises a processor configured to perform a wireless communication method of any of the foregoing described methods.

The present disclosure relates to a network entity. The network entity comprises a communication unit, configured to:

transmitting, to a wireless terminal, a terminal configuration associated with aperiodic positioning reference signals, PRSs, and transmitting, to each of a serving node of the wireless terminal and at least one neighbor node, a node configuration associated with the aperiodic PRSs.

Various embodiments may implement the following feature:

In some embodiments, the network entity further comprises a processor configured to perform a wireless communication method of any of the foregoing described methods.

The present disclosure relates to a serving node. The serving node comprises a communication unit, configured to:

receiving, from a network entity, a node configuration associated with aperiodic positioning reference signals, PRSs, and transmitting, to a wireless terminal, downlink control information, DCI, of triggering at least one of the aperiodic PRSs.

Various embodiments may preferably implement the following feature:

In some embodiments, the serving node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIG. 10 shows a flowchart of a process according to an embodiment of the present disclosure.

FIG. 11 shows a flowchart of a process according to an embodiment of the present disclosure.

DETAILED DESCRIPTION

Figure 1:
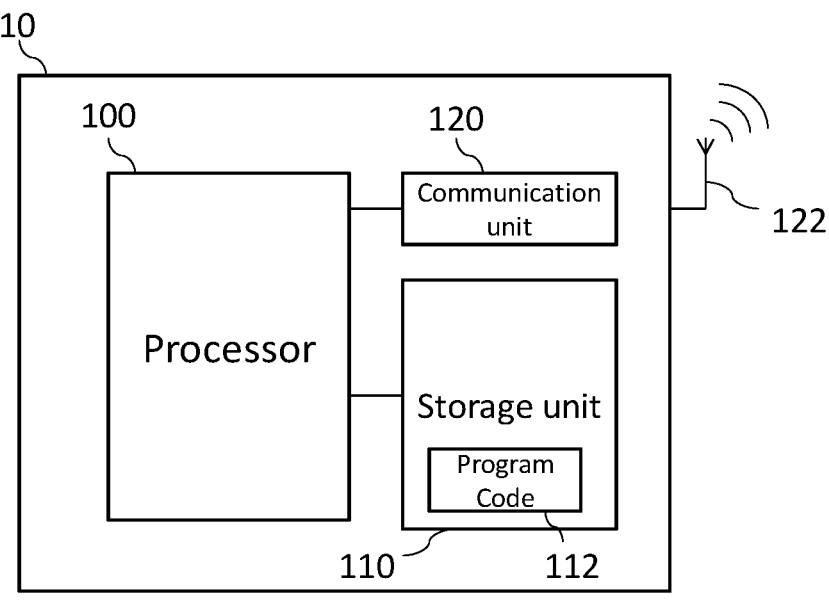
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
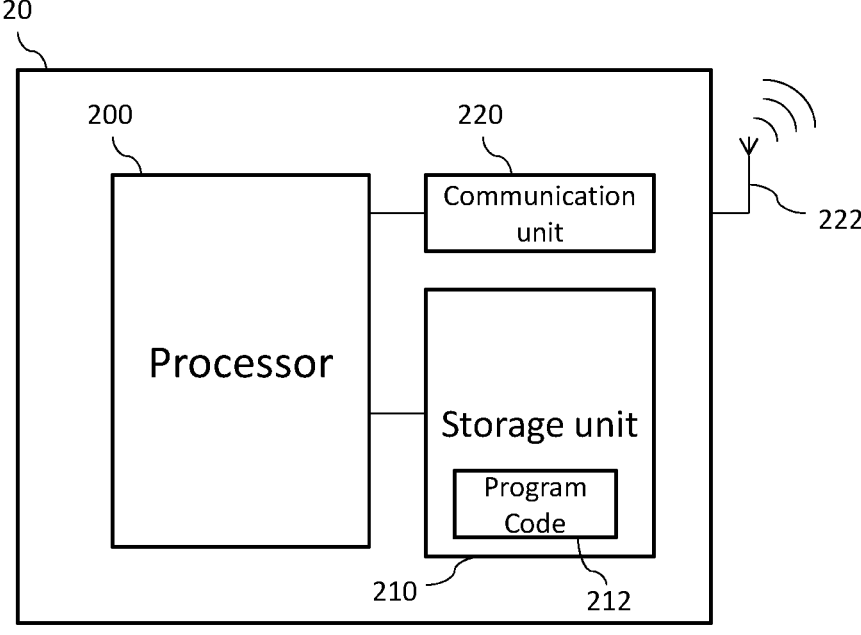
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), a location management function (LMF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

Figures 3, 4, 5:
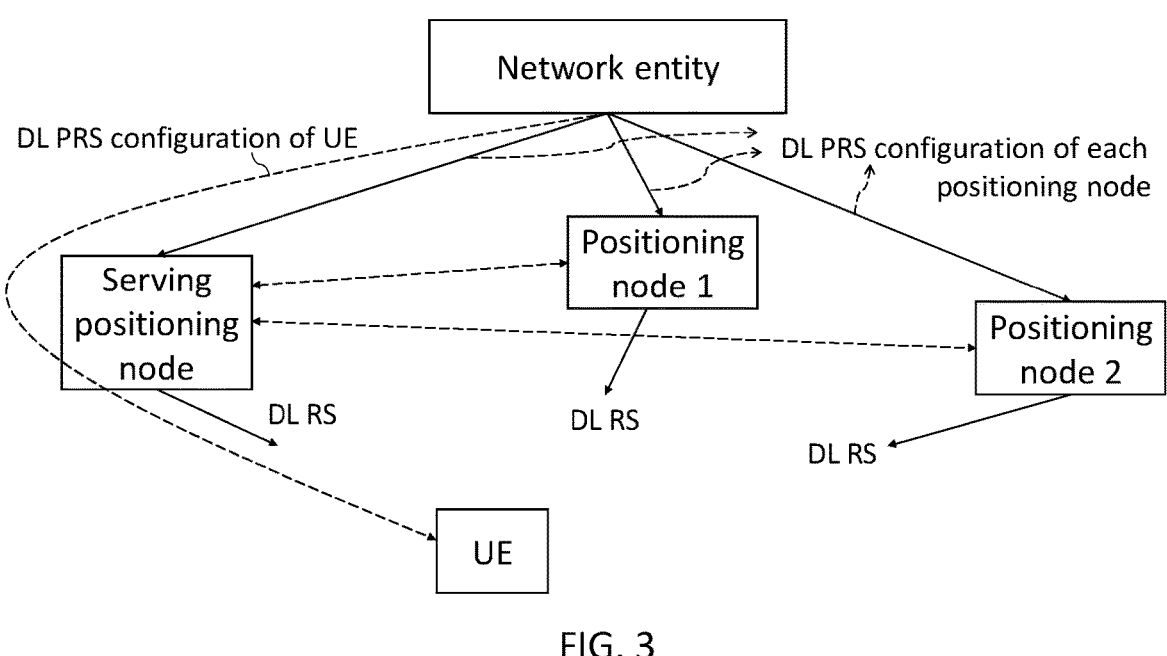
FIG. 3 shows a schematic diagram of a network according to an embodiment of the present disclosure.
FIG. 4 shows a schematic diagram of a field in downlink control information for triggering aperiodic downlink positioning reference signal(s) according to an embodiment of the present disclosure.
FIG. 5 shows a schematic diagram of a field in downlink control information for triggering aperiodic downlink positioning reference signal(s) according to an embodiment of the present disclosure.

FIG. 3 shows a schematic diagram of a network according to an embodiment of the present disclosure. In FIG. 3, the network comprises a network entity, a UE, a serving node of the UE and two neighbor nodes (i.e. neighbor node 1 and neighbor node 2). In an embodiment, the serving node, the neighbor node 1 and 2 may be a RAN node, a BS or a gNB. In this embodiment, a downlink positioning reference signal (DL PRS) is configured based on the following procedures. Note that, in the present disclosure, the DL PRS may be equal to the PRS.

1) The DL PRS is configured by the network entity (e.g. the LMF) to the UE. In an embodiment, the configuration of the DL PRS (e.g. DL PRS configuration) is transmitted to the UE via the serving node and is transparent to the serving node of the UE.
  2) The serving node and the neighbor nodes 1 and 2 may also be informed of the DL PRS configuration by the network entity. Note that each of the serving node and the neighbor nodes 1 and 2 may only receive the DL PRS configuration related to itself.

3) The UE receives DL PRS(s) as configured by the network entity (e.g. the LMF).

4) In an embodiment, a framework of the DL PRS configuration is shown as the following:

QOM The network entity may configure M frequency layer(s), wherein M is a positive integer. In an embodiment, a single frequency layer is a collection of DL PRS resource sets across one or more nodes (e.g. serving node and/or neighbor node 1 and/or neighbor node 2) which have the same subcarrier spacing (SCS), the same cyclic prefix (CP) type, the same central frequency, the same reference frequency point (e.g. point-A), the same configured bandwidth (BW) and the same comb configuration (e.g. combSize). In an embodiment, the frequency layer is identified by a frequency layer identification (ID).

There are N node(s) configured under each frequency layer, wherein N is a positive integer and the N node(s) is identified by node ID information. Note that, in the present disclosure, the node(s) may be equal to the neighbor node(s) and/or the serving node.

The DL PRS resource sets are configured per node, wherein each of the DL PRS resource sets is identified by corresponding DL PRS resource set ID.

In an embodiment, the DL PRS resources are configured within each of the DL PRS resource sets and are identified by corresponding DL PRS resource IDs.

In the present disclosure, methods for aperiodic DL PRS transmissions are disclosed. In an embodiment, at least one of trigger state ID information, frequency layer ID information, node ID information, DL PRS resource set ID information, DL PRS resource ID information, transmission offset information, path loss reference information and quasi co-location (relation) information associated with the aperiodic DL PRS(s) may be dynamically determined (updated or overridden) by DL control information (DCI).

In the present disclosure, the trigger state ID information represents information indicating at least one trigger state and/or at least one trigger state ID. Similarly, the frequency layer ID information represents information indicating at least one frequency layer and/or at least one frequency layer state ID, the node ID information indicates at least one node (e.g. wireless network node, BS, RAN node, gNB, etc.) and/or at least one node ID, and so on.

In the present disclosure, methods of configuring the aperiodic DL PRS are exemplified in the following embodiments.

In an embodiment, the aperiodic DL PRS is configured by the network entity (e.g. LMF). In this embodiment, a configuration of the aperiodic DL PRS (e.g. aperiodic DL PRS configuration) is transmitted to the UE via the serving node of the UE and is transparent to the serving node. In addition, the configuration associated with each DL PRS may be uniquely identified by at least one of a frequency layer ID, node ID information, a DL PRS set ID and/or DL PRS resource ID. In an embodiment, the serving node of the UE and the neighbor node(s) of the UE may also receive the aperiodic DL PRS configuration from the network entity. Note that each of the serving node and/or the neighbor node(s) may only receive the configuration of the aperiodic DL PRS which is needed to be transmitted by itself.

In an embodiment, the aperiodic DL PRS is configured by the LMF. In this embodiment, the aperiodic DL PRS configuration is transmitted to the UE via the serving node of the UE and is transparent to the serving node. In addition, configuration associated with each aperiodic DL PRS is packed into certain trigger states, wherein each trigger state is associated with at least one of the frequency layer ID, the node ID information, the DL PRS set ID and/or the DL PRS resource ID. In an embodiment, the serving node of the UE and the neighbor node(s) of the UE may also receive the aperiodic DL PRS configuration from the network entity. Note that each of the serving node and/or the neighbor node(s) may only receive the aperiodic DL PRS configuration which is needed to be transmitted by itself.

In an embodiment, the aperiodic DL PRS is configured by the LMF. In this embodiment, the aperiodic DL PRS configuration is transmitted to the serving node and the UE is informed of the aperiodic DL PRS configuration by an RRC signaling from the serving node. That is, the serving node acknowledges the aperiodic DL PRS configuration associated with the UE. In addition, the configuration associated with each DL PRS in the aperiodic DL PRS configuration may be uniquely identified by at least one of the frequency layer ID, the node ID information, the DL PRS set ID and/or the DL PRS resource ID. In an embodiment, the serving node of the UE and the neighbor node(s) of the UE may also receive the aperiodic DL PRS configuration from the network entity. Note that each of the serving node and/or the neighbor node(s) may only receive the aperiodic DL PRS configuration associated with itself.

In an embodiment, the aperiodic DL PRS is configured by LMF. In this embodiment, the aperiodic DL PRS configuration is transmitted to the serving node and the UE is informed of the aperiodic DL PRS configuration by an RRC signaling. In addition, the configuration associated with each DL PRS is packed into certain trigger states, wherein each trigger state is associated with at least one of the frequency layer ID, the node ID information, the DL PRS set ID and/or the DL PRS resource ID. In an embodiment, the serving node of the UE and the neighbor node(s) of the UE may also receive the aperiodic DL PRS configuration from the network entity. Note that each of the serving node and/or the neighbor node(s) may only receive the aperiodic DL PRS configuration associated with itself.

In the present disclosure, methods of triggering the aperiodic DL PRS are exemplified as the following.

In an embodiment, the aperiodic DL PRS may be triggered (e.g. requested) by the LMF. For example, the LMF may transmit, to the serving node and/or neighbor node(s), certain information (e.g. a request command) of the aperiodic DL PRS(s) which is requested to be transmitted. Based on the information received from the network entity, the serving node transmits corresponding DCI to the UE, to trigger the aperiodic DL PRS(s).

In an embodiment, the aperiodic DL PRS may be triggered (e.g. requested) by the UE. For example, the UE may transmit a request command to the LMF for triggering the aperiodic DL PRS, wherein the request command is transparent to the serving node. Based on the request command, the LMF transmits the information (e.g. the request command) associated with the aperiodic DL PRS(s) to the serving node and/or neighbor node(s). According to the information associated with the aperiodic DL PRS(s), the serving node transmits the DCI to the UE for triggering the aperiodic DL PRS(s).

In an embodiment, the UE does not transmit the request command and the serving node directly transmits the DCI for triggering the aperiodic DL PRS. In addition, the serving node may also inform the neighbor node(s) of the information of the aperiodic DL PRS which is required to be transmitted by the neighbor node(s). Note that each neighbor node may receive the information of the aperiodic DL PRS required to be transmitted by itself. In an embodiment, the serving node may communicate with the neighbor node(s)

through the connection between the serving node and the neighbor node(s) (e.g. the dot lines between the serving node and each of the neighbor nodes 1 and 2 shown in FIG. 3).

In an embodiment, the aperiodic DL PRS is requested by the UE. In this embodiment, the UE transmits the request command to the serving node. Based on the request command, the serving node transmits the corresponding DCI to the UE, to trigger the aperiodic DL PRS(s). In addition, the serving node may also inform the neighbor node(s) of the information of the aperiodic DL PRS(s) which is required to be transmitted by the neighbor node(s). Note that each neighbor node may receive the information of the aperiodic DL PRS(s) required to be transmitted by itself. In an embodiment, the serving node may communicate with the neighbor node(s) through the connection between the serving node and the neighbor node(s) (e.g. the dot lines between the serving node and each of the neighbor nodes 1 and 2 shown in FIG. 3).

In an embodiment, the request command may have at least one of the following information: (Note that the following information may not be applicable only to the aperiodic DL PRS)

A) Frequency information of the (requested) aperiodic DL PRS (e.g. information related to a central frequency and/or a bandwidth);

B) Node ID information;

C) Periodicity of the (requested) DL PRS (e.g. the periodicity, periodical DL PRS, semi-persistent DL PRS, or aperiodic DL PRS);

D) Beam information of the (requested) DL PRS (e.g. wider or narrower beam),

E) Abort or continue the transmission of the DL PRS.

In an embodiment, DCI field(s) for triggering the aperiodic DL PRS is associated with (e.g. indicates or comprises) at least one of the trigger state ID information, the frequency layer ID information, the node ID information, the DL PRS set ID information, the DL PRS resource ID information, the transmission offset information and/or the quasi co-location (QCL) information.

In an embodiment, each codepoint of the DCI field for triggering the aperiodic DL PRS is associated at least with one trigger state ID. FIG. 4 shows a schematic diagram of the DCI field for triggering the aperiodic DL PRS according to an embodiment of the present disclosure. In FIG. 4, the DCI field for triggering the aperiodic DL PRS comprises 4 bits and each code point of this DCI field (i.e. four bits) is associated with (e.g. indicates) a single trigger state. For example, the codepoint "0001" may be associate with a trigger state whose ID is "1". Based on the DCI field of triggering the aperiodic DL PRS, the DL PRS(s) associated with the trigger state with the ID "1" is triggered and transmitted to the UE.

In an embodiment, each codepoint of the DCI field of triggering the aperiodic DL PRS is associated at least with one frequency layer ID. Taking the DCI field shown in FIG. 4 as an example, each codepoint of the DCI field is associated with (e.g. indicates) a single frequency layer ID. Based on the DCI field of triggering the aperiodic DL PRS, the DL PRS(s) associated with the indicated frequency layer ID is triggered.

In an embodiment, the DCI field of triggering the aperiodic DL PRS may be associated with (e.g. indicate) at least one combination of the frequency layer ID information and the node ID information. In this embodiment, the DL PRS(s) associated with the frequency layer ID indicated by the DCI field and the node ID corresponding to the indicated frequency layer ID is triggered. FIG. 5 shows a schematic diagram of the DCI field of triggering the aperiodic DL PRS according to an embodiment of the present disclosure. In FIG. 5, the DCI field of triggering the aperiodic DL PRS comprises 2 frequency layer ID information 1 and 2 and their corresponding node ID information. Based on the DCI field shown in FIG. 5, the DL PRS(s) associated with the frequency layer ID information 1 and the node ID information corresponding to (e.g. subsequent to) the frequency layer ID information 1 is triggered. Similarly, the DL PRS(s) associated with the frequency layer ID information 2 and the node ID information corresponding to (e.g. subsequent to) the frequency layer ID information 2 is also triggered based on the DCI field shown in FIG. 5.

In an embodiment, radio frame boundaries of different nodes may not perfectly align. Thus, there may be a reference node and each of the neighbor nodes except for the reference node may determine a system frame number (SFN) offset and/or a subframe offset by comparing its radio frames to those of the reference node. The definitions of the SFN offset and the subframe offset are illustrated in the following.

SFN offset: The SFN offset of a neighbor node specifies the SFN offset at the node antenna location between the reference node and this neighbor node. The SFN offset corresponds to the number of full radio frames counted from the beginning of a radio frame #0 of the reference node to the beginning of the closest subsequent radio frame #0 of this neighbor node.

Subframe offset: The subframe offset of a neighbor node specifies the frame boundary offset at the node antenna location between the reference node and this neighbor node counted in full subframes. The subframe offset is counted from the beginning of a subframe #0 of the reference node to the beginning of the closest subsequent subframe #0 of this neighbor node and is rounded down to multiples of subframes.

In an embodiment, an aperiodic DL PRS offset is provided and defines a time offset between the DCI reception time (i.e. the time of receiving the DCI) and the aperiodic DL PRS reception time (i.e. the time of the aperiodic DL PRS is (expected to be) received by the UE). In an embodiment, the aperiodic DL PRS offset may be determined based on the DCI of triggering the aperiodic DL PRS (e.g. the offset information comprised in the DCI). In an embodiment, this aperiodic DL PRS offset may be provided per DL PRS resource or per DL PRS resource set.

In an embodiment, there is the offset between the subframe containing the DCI that triggers a set of aperiodic DL PRS resources and the subframe in which the first symbol of the aperiodic DL PRS resource set is received by the UE. In this embodiment, all the time offset information is determined at least based on the node where the DCI of triggering the aperiodic DL PRS(s) is transmitted (i.e. the serving node). In an embodiment, the time offset information is comprised in the DCI.

Figure 6:
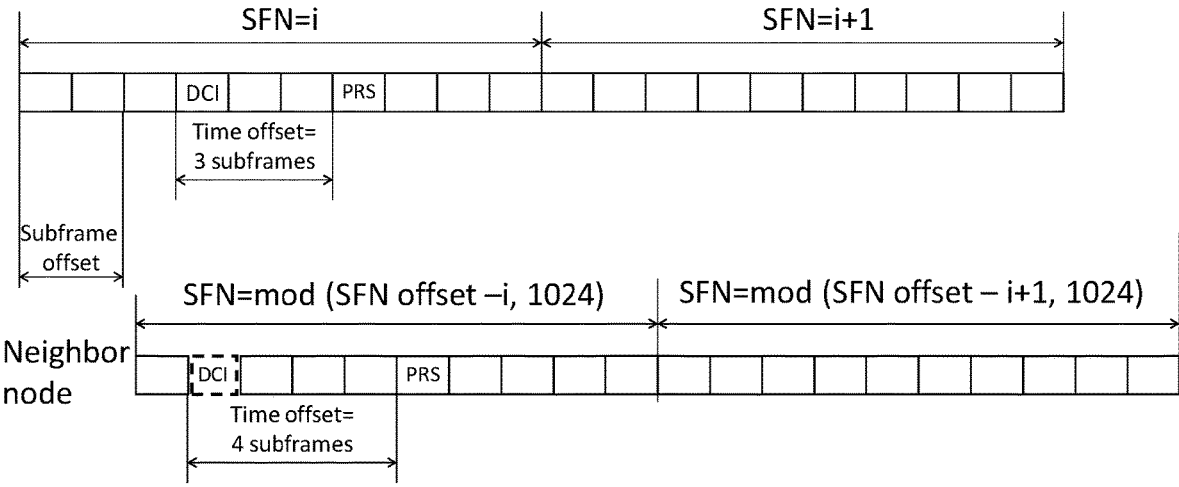
FIG. 6 shows a timing diagram of signals transmitted/received by the serving node and the neighbor node according to an embodiment of the present disclosure.

FIG. 6 shows a timing diagram of signals transmitted by the serving node and the neighbor node according to an embodiment of the present disclosure. In FIG. 6, the reference node is the serving node. In detail, a subframe offset between the serving node and the neighbor node is 2 subframes and the SCS is 15 KHz. As shown in FIG. 6, the DCI of the serving node is received by the UE in the fourth subframe (i.e. the subframe whose subframe number=4) in the frame whose SFN=i. In this embodiment, the aperiodic DL PRS offset for the aperiodic DL PRS transmitted in the serving node is 3 subframes. Under such condition, the first symbol of the aperiodic DL PRS is transmitted on the 7th subframe (i.e. the subframe whose subframe number=7) in the frame whose SFN=i.

In an embodiment, the UE assumes a virtual DCI is received in the 2nd subframe (i.e. the subframe whose subframe number=2) from the neighbor node. Note that, the subframe in which the virtual DCI is located is determined by where the DCI of triggering the DL PRS is received, and at least one of the subframe offset and/or the SFN offset between the serving node and the neighbor node). For example, the subframe number of the subframe at which the virtual DCI is assumed is determined by subtracting 4 (i.e. the subframe number of the subframe in which the DCI is received) by 2 (i.e. the subframe offset). In addition, the virtual DCI is the reference for the UE determining the time offset for the aperiodic DL PRS transmitted by the neighbor node. In the embodiment shown in FIG. 6, the time offset of aperiodic DL PRS (i.e. the aperiodic DL PRS offset) associated with the neighbor node is 4 subframes. Based on the assumption related to the virtual DCI, the UE may determine that the first symbol of the aperiodic DL PRS is transmitted on the 6th subframe (i.e. the subframe whose subframe number=2 (virtual DCI)+4 (DL PRS offset)). That is, the UE may receive or expect to receive the aperiodic DL PRS on the 6th subframe from the neighbor node.

In an embodiment, the SCS is larger than 15 KHz and one subframe may have more than one slot. In this embodiment, the slot in which the first symbol of the aperiodic DL PRS is transmitted may be determined by the subframe offset and a slot offset within the subframe.

In an embodiment, the offset between the slot containing the DCI that triggers aperiodic DL PRS(s) and the slot in which the first symbol of the aperiodic DL PRS is received from the serving node. In this embodiment, all the time offset information is determined at least based on information associated with the node where the DCI of triggering the aperiodic DL PRS resource set is transmitted (i.e. the serving node).

Figure 7:
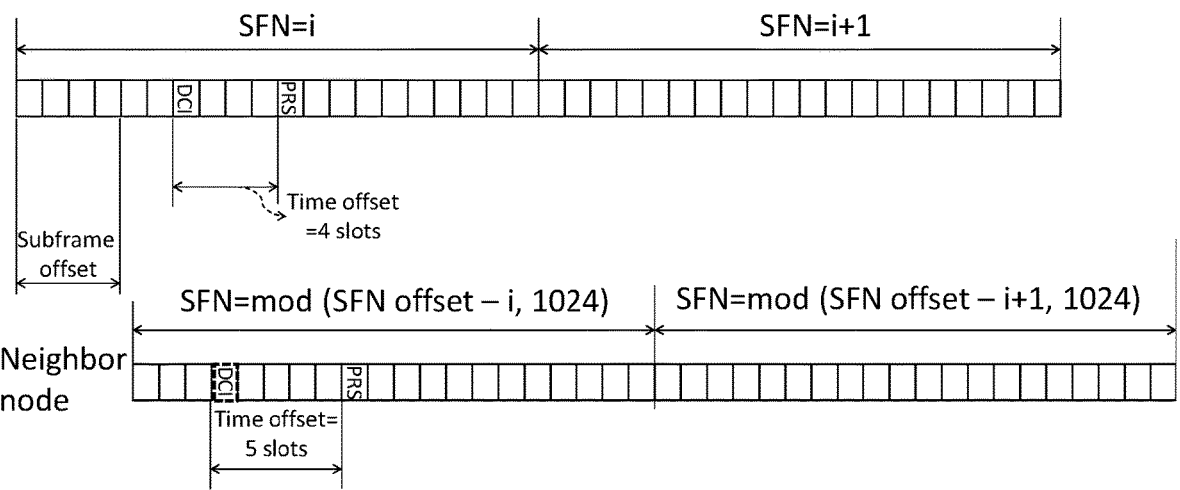
FIG. 7 shows a timing diagram of signals transmitted/received by the serving node and the neighbor node according to an embodiment of the present disclosure.

FIG. 7 shows a timing diagram of signals transmitted by the serving node and the neighbor node according to an embodiment of the present disclosure. In FIG. 7, the reference node is the serving node. More specifically, the subframe offset between the serving node and the neighbor node is 2 subframes, the SCS is 30 KHz, and each subframe comprises 2 slots. As shown in FIG. 7, the DCI of triggering the aperiodic DL PRS(s) is received, by the UE, in the first slot of the 4th subframe (i.e. 7th slot). In this embodiment, the slot offset for the aperiodic DL PRS transmitted by the serving node is 4 slots.

In an embodiment, the UE assumes the virtual DCI is on the 2nd subframe based on the subframe where the DCI of triggering the aperiodic PRS(s) is received by the UE and at least one of the subframe offset and/or the SFN offset between the serving node and the neighbor node. For example, the subframe number of the subframe at which the virtual DCI is assumed is determined by subtracting 4 (i.e. the subframe number of the subframe in which the DCI is received) by 2 (i.e. the subframe offset). Note that the virtual DCI is assumed at the last slot of the determined subframe (i.e. the second slot of the 2nd subframe or the 4th slot). In this embodiment, the virtual DCI is the reference of the UE determining the slot in which the aperiodic DL PRS is transmitted by the neighbor node. In this embodiment, the time offset of the aperiodic DL PRS transmitted by the neighbor node is 5 slots. Thus, the DL PRS transmitted by the neighbor node is in the first slot of the 4th subframe (i.e.

9th slot=4th slot (virtual DCI)+5 slots (the time offset of the aperiodic DL PRS transmitted by the neighbor node)).

Figure 8:
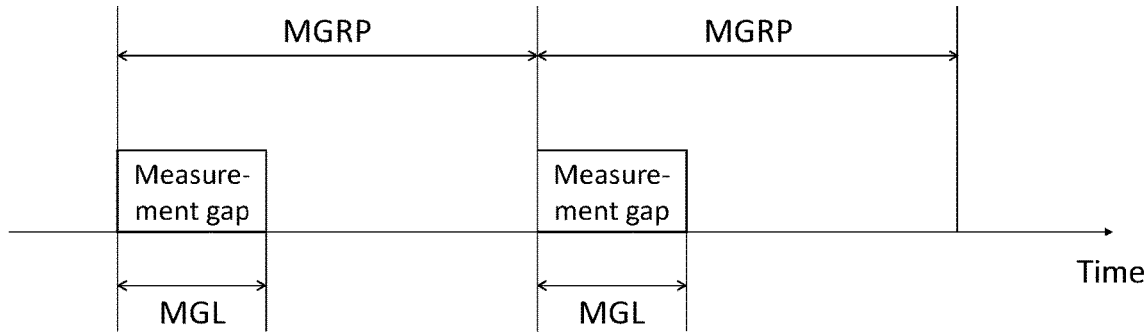
FIG. 8 shows a timing diagram of a measurement gap pattern according to an embodiment of the present disclosure.

Because the bandwidth/center frequency/SCS of the DL PRS may be different from that of the serving cell, the DL PRS may only be received, by the UE, within a measurement gap. More specifically, the network may configure a measurement gap pattern as shown in FIG. 8, wherein a length of the measurement gap is called measurement gap length (MGL) and the periodicity of the measurement gap pattern is called measurement gap repetition period (MGRP). In an embodiment, the time of the UE receiving the aperiodic DL PRS may take the measurement gap configuration into consideration.

In an embodiment, the UE is expected not to measure (e.g. receive) the aperiodic DL PRS(s) outside the measurement gaps.

In an embodiment, the aperiodic DL PRS(s) triggered by the same DCI is received within the same measurement gap.

In an embodiment, the aperiodic DL PRS(s) triggered by the same DCI is received within the measurement gap(s), e.g., in different MGRPs.

In an embodiment, the aperiodic DL PRS(s) associated with the same trigger state ID and triggered by the same DCI is received within the measurement gap(s), e.g., in different MGRPs.

In an embodiment, the aperiodic DL PRS associated with the same trigger state ID and triggered by the same DCI is received within the same measurement gap.

In an embodiment, the aperiodic DL PRS associated with the same frequency layer ID and triggered by the same DCI is received within the measurement gap(s), e.g., in different MGRPs.

In an embodiment, the aperiodic DL PRS associated with the same frequency layer ID and triggered by the same DCI is received within the same measurement gap.

In an embodiment, the time of receiving the DCI (e.g. DCI received time) for the aperiodic DL PRS and the time of reporting the measurement results (e.g. report time) of the aperiodic DL PRS may comply with at least one of the following rules:

1) The UE is not expected to receive any DCI for triggering the aperiodic DL PRS within the measurement gap.

2) Any measurement (result) feedback (e.g. report) based on the aperiodic DL PRS is transmitted after the aperiodic DL PRS reception and outside the measurement gap.

In an embodiment, the time of receiving the aperiodic DL PRS may have certain restrictions. For example, a time gap between the time of receiving the DCI for triggering the aperiodic DL PRS and the starting time of a measurement gap, in which the earliest aperiodic DL PRS triggered by the DCI is located, is not smaller than (i.e. greater than and/or equal to) a first threshold. As an alternative or in addition, a time gap between the time of receiving the DCI for triggering the aperiodic DL PRS and the time of receiving the earliest aperiodic DL PRS triggered by the DCI is not smaller than (i.e. greater than and/or equal to) a second threshold.

In an embodiment, the first threshold and/or the second threshold is determined based on the UE capability.

In an embodiment, based on the UE capability, the UE may apply the restriction associated to at least one of the first threshold or the second threshold on receiving the aperiodic DL PRS.

Figure 9:
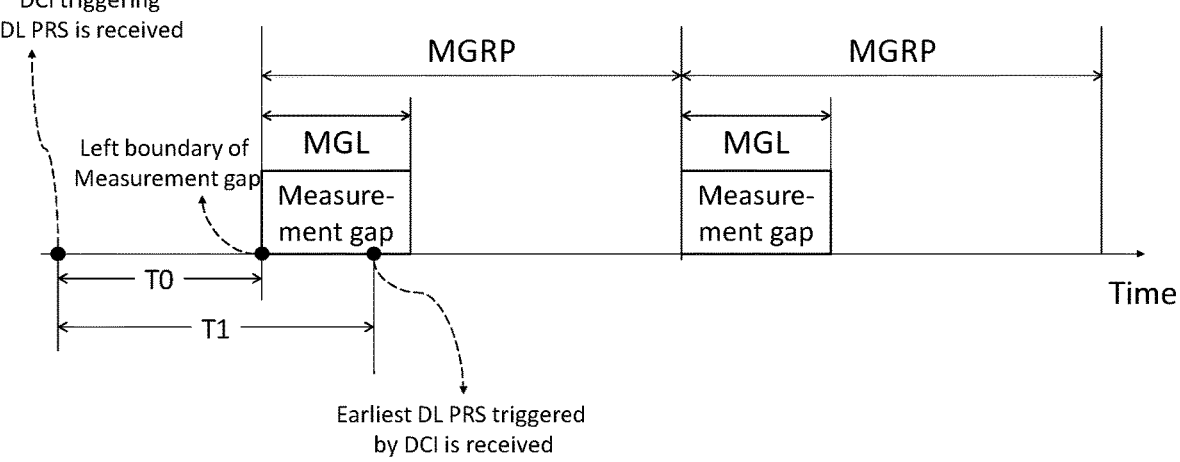
FIG. 9 shows a timing diagram of a measurement gap pattern according to an embodiment of the present disclosure.

FIG. 9 shows a timing diagram of a measurement gap pattern according to an embodiment of the present disclosure. In this embodiment, the UE receiving the DCI for triggering the aperiodic DL PRS(s) and the earliest aperiodic DL PRS triggered by the DCI is located in the next measurement gap. In an embodiment, a time gap T0 between the time of receiving the DCI for triggering the aperiodic DL PRS and the starting time (i.e. the left boundary) of the next measurement gap is not smaller than (i.e. greater than or equal to) a threshold TH0. As an alternative or in addition, a time gap T1 between the time of receiving the DCI for triggering the aperiodic DL PRS and the time of receiving the earliest aperiodic DL PRS triggered by the DCI is smaller than (i.e. greater than or equal to) another threshold TH1. In an embodiment, the threshold TH0 and/or TH1 is/are determined based on the UE capability. In an embodiment, based on the UE capability, the UE may consider the restriction on at least one of the time gaps T0 and T1 (e.g. T0≥TH0 and/or T1≥TH1).

In an embodiment, the reference node may be determined based on the DCI triggering the aperiodic DL PRS. For example, the reference node may be the node corresponding to the lowest node ID within the trigger state indicated by the DCI triggering the aperiodic DL PRS. As an alternative, the reference node may be the node corresponding to the lowest node ID within the frequency layer indicated by the DCI triggering the aperiodic DL PRS. In an embodiment of the DCI triggering the aperiodic DL PRS indicating multiple frequency layers, the node corresponding to the lowest node ID within each of the frequency layers indicated by the DCI triggering the aperiodic DL PRS is the reference node.

In an embodiment, the aperiodic DL PRS may be indicated with a high priority. In this embodiment, the reception of the aperiodic DL PRS may be prioritized over certain channels or signals. For example, when the signals/channels whose priorities are lower than that of the aperiodic DL PRS collide the aperiodic DL PRS in time domain within the MGL, the UE may only receive the aperiodic DL PRS.

FIG. 10 shows a flowchart of a process according to an embodiment of the present disclosure. The process shown in FIG. 10 may be used in a wireless terminal (e.g. UE) and comprises the following steps:

Step 1001: Receive, from a network entity, a terminal configuration associated with aperiodic PRSs.

Step 1002: Receive, from a serving node of the wireless terminal, DCI of triggering at least one of the aperiodic PRSs.

Step 1003: Receive the at least one of the aperiodic PRSs based on the received DCI and the terminal configuration associated with the aperiodic PRSs.

In the process shown in FIG. 10, the wireless terminal receives a terminal configuration associated with aperiodic PRSs (e.g. the aperiodic PRS configuration or the configuration of the aperiodic PRSs) from a network entity (e.g. the LMF). In addition, the wireless terminal may receive DCI of triggering at least one of the aperiodic PRSs from a serving node of the wireless terminal. Based on the received DCI and the terminal configuration, the wireless receives the at least one of the aperiodic PRSs, e.g. from the serving node and/or at least one neighbor node. In an embodiment, the wireless terminal may perform measurements (e.g. positioning) based on the received at least one of the aperiodic PRSs.

In an embodiment, the terminal configuration associated with each of the aperiodic PRSs comprises (e.g. indicates or is associated with) at least one of a trigger state identification, ID, frequency layer ID, node ID information, a PRS resource set ID or a PRS resource ID.

In an embodiment, the terminal configuration is received via the serving node of the wireless terminal. In an embodiment, the terminal configuration is transparent to the serving node.

In an embodiment, the wireless terminal transmits a request command for the aperiodic PRS to the network entity or the serving node.

In an embodiment, the request command comprises at least one of frequency information of the (requested) aperiodic PRS, node ID information, periodicity information indicating the aperiodic PRS or beam information of the (requested) aperiodic PRS.

In an embodiment, the DCI comprises a field of triggering the at least one of the aperiodic PRSs, wherein the field indicates at least one of trigger state ID information, frequency layer ID information, node ID information, resource set ID information, resource ID information, transmission offset information, path loss reference information or quasi-co-location information.

In an embodiment, at least one time of receiving the at least one of the aperiodic PRSs is determined based on a time of receiving the DCI of triggering the at least one of the aperiodic PRSs and at least one PRS offset corresponding the at least one of the aperiodic PRSs.

In an embodiment, the time of receiving the PRS transmitted by the serving node out of the at least one of the aperiodic PRSs is after the time of receiving the DCI of triggering the at least one of the aperiodic PRSs plus the PRS offset corresponding to the PRS transmitted by the serving node out of the at least one of the aperiodic PRSs.

In an embodiment, the time of receiving the PRS transmitted by a neighbor node out of the at least one of the aperiodic PRSs is after a time of virtual DCI plus the PRS offset corresponding to the PRS transmitted by the neighbor node out of the at least one of the aperiodic PRSs, wherein the time of the virtual DCI is determined based on the time of receiving the DCI of triggering the at least one of the aperiodic PRSs and at least one of a subframe offset or a system frame number offset between the serving node and the neighbor node.

In an embodiment, the at least one of the aperiodic PRSs is received within at least one measurement gap in at least one measurement gap repetition period.

In an embodiment, a time gap between a time of receiving the DCI and a time associated with the earliest PRS of the at least one of the aperiodic PRSs triggered by the DCI is greater than or equal to a threshold.

In an embodiment, the time associated with the earliest one of the at least one of the aperiodic PRSs triggered by the DCI is selected, based on a capability of the wireless terminal, from one of a starting time of a measurement gap in which the earliest PRS of the at least one of the aperiodic PRSs triggered by the DCI is located or a time of receiving the earliest PRS of the at least one of the aperiodic PRSs triggered by the DCI.

FIG. 11 shows a flowchart of a process according to an embodiment of the present disclosure. The process shown in FIG. 11 may be used in a network entity (e.g. the LMF) and comprises the following steps:

Step 1101: Transmit, to a wireless terminal, a terminal configuration associated with an aperiodic PRSs.

Step 1102: Transmit, to each of a serving node and at least one neighbor node, a node configuration associated with the aperiodic PRSs.

In the process shown in FIG. 11, the network entity transmits a terminal configuration associated with aperiodic PRSs to a wireless terminal (UE). In addition, the network entity also transmits a node configuration associated with the aperiodic PRSs to each of a serving node and at least one neighbor node.

In an embodiment, the terminal configuration and/or the node configuration associated with each of the aperiodic PRSs comprises at least one of a trigger state identification, ID, frequency layer ID, node ID information, a PRS resource set ID or a PRS resource ID.

In an embodiment, the terminal configuration is transmitted via the serving node of the wireless terminal.

In an embodiment, the terminal configuration is transparent to the serving node.

In an embodiment, the network entity may receive a request command for the aperiodic PRS from the wireless terminal. Based on the request command, the network entity transmits information associated with at least one of the aperiodic PRSs for the wireless terminal.

In an embodiment, the network entity transmits a request command for the aperiodic PRS to the serving node.

In an embodiment, the request command comprises at least one of frequency information of the (requested) aperiodic PRS, node ID information, periodicity information indicating the aperiodic PRS or beam information of the (requested) aperiodic PRS.

Figure 12:
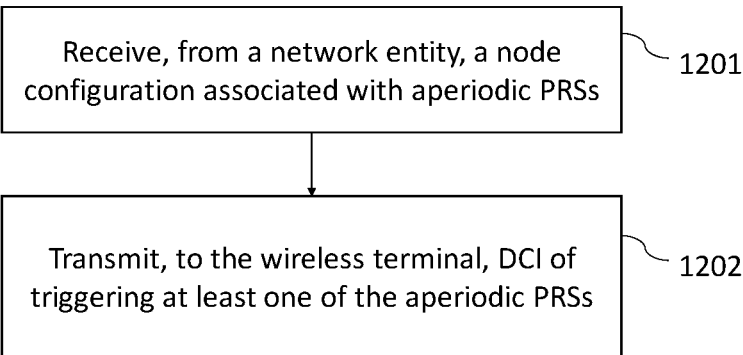
FIG. 12 shows a flowchart of a process according to an embodiment of the present disclosure.

FIG. 12 shows a flowchart of a process according to an embodiment of the present disclosure. The process shown in FIG. 12 may be used in a wireless network node (e.g. a serving node of a wireless terminal) and comprises the following steps:

Step 1201: Receive, from a network entity, a node configuration associated with aperiodic PRSs.

Step 1202: Transmit, to the wireless terminal, DCI of triggering at least one of the aperiodic PRSs.

In the process shown in FIG. 12, the serving node receives a node configuration associated with an aperiodic PRS from a network entity (e.g. the LMF). Note that the serving node may receive only the node configuration of the aperiodic PRS associated with itself. In addition, the serving node transmits DCI of triggering at least one of the aperiodic PRSs to the wireless terminal.

In an embodiment, the node configuration associated with each of the aperiodic PRS is associated with at least one of a trigger state identification, ID, frequency layer ID, node ID information, a PRS resource set ID or a PRS resource ID.

In an embodiment, the DCI comprises a field of triggering the at least one of the aperiodic PRSs, wherein the field indicates at least one of trigger state ID information, frequency layer ID information, node ID information, resource set ID information, resource ID information, transmission offset information, path loss reference information or quasi-co-location information.

In an embodiment, the serving node may receive a terminal configuration associated with the aperiodic PRSs associated with the wireless terminal from the network entity and transmit (e.g. forward) the terminal configuration to the wireless terminal.

In an embodiment, the terminal configuration is transparent to the serving node.

In an embodiment, the serving node receives a request command for the aperiodic PRS from one of the wireless terminal or the network entity.

In an embodiment, the request command comprises at least one of frequency information of the (requested) aperiodic PRS, node ID information, periodicity information indicating the aperiodic PRS or beam information of the (requested) aperiodic PRS.

In an embodiment, the serving node receives information associated with the at least one of the aperiodic PRSs from the network entity.

In an embodiment, the serving node may transmit, to at least one neighbor node, information associated with at least one of the aperiodic PRSs transmitted by the at least one neighbor node out of the at least one of the aperiodic PRSs.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:
   receiving, from a network entity, a terminal configuration associated with aperiodic positioning reference signals (PRSs), wherein the terminal configuration associated with each of the aperiodic PRSs comprises at least one of a trigger state identification, ID, frequency layer ID, or node ID information;
   receiving, from a serving node of the wireless terminal, downlink control information (DCI) of triggering at least one of the aperiodic PRSs; and
   receiving the at least one of the aperiodic PRSs based on the received DCI and the terminal configuration,
   wherein the at least one of the aperiodic PRSs is received within at least one measurement gap in at least one measurement gap repetition period, and
   wherein a time gap between a time of receiving the DCI and a time associated with the earliest PRS of the at least one of the aperiodic PRSs triggered by the DCI is greater than or equal to a threshold, wherein the time associated with the earliest one of the at least one of the aperiodic PRSs triggered by the DCI is selected, based on a capability of the wireless terminal, from one of a starting time of a measurement gap in which the earliest PRS of the at least one of the aperiodic PRSs triggered by the DCI is located or a time of receiving the earliest PRS of the at least one of the aperiodic PRSs triggered by the DCI.

2. The wireless communication method of claim 1, wherein the terminal configuration is received via the serving node of the wireless terminal, or is transparent to the serving node.

3. The wireless communication method of claim 1, further comprising:
   transmitting, to the network entity or the serving node, a request command for the aperiodic PRS, wherein the request command comprises at least one of frequency information of the aperiodic PRS, node ID information, periodicity information indicating the aperiodic PRS or beam information of the aperiodic PRS.

4. The wireless communication method of claim 1, wherein the DCI comprises a field of triggering the at least one of the aperiodic PRSs, wherein the field indicates at least one of trigger state ID information, frequency layer ID information, node ID information, resource set ID information, resource ID information, transmission offset information, path loss reference information or quasi-co-location information.

5. The wireless communication method of claim 1, wherein at least one time of receiving the at least one of the aperiodic PRSs is determined based on a time of receiving the DCI of triggering the at least one of the aperiodic PRSs and at least one PRS offset corresponding the at least one of the aperiodic PRSs,
   wherein the time of receiving the PRS transmitted by the serving node out of the at least one of the aperiodic PRSs is after the time of receiving the DCI of triggering the at least one of the aperiodic PRSs plus the PRS offset corresponding to the PRS transmitted by the serving node out of the at least one of the aperiodic PRSs.

6. The wireless communication method of claim 5, wherein the time of receiving the PRS transmitted by a neighbor node out of the at least one of the aperiodic PRSs is after a time of virtual DCI plus the PRS offset corresponding to the PRS transmitted by the neighbor node out of the at least one of the aperiodic PRSs, wherein the time of the virtual DCI is determined based on the time of receiving the DCI of triggering the at least one of the aperiodic PRSs and at least one of a subframe offset or a system frame number offset between the serving node and the neighbor node.

7. A wireless communication method for use in a network entity, the wireless communication method comprising:

transmitting, to a wireless terminal, a terminal configuration associated with aperiodic positioning reference signals (PRSs); and transmitting, to each of a serving node of the wireless terminal and at least one neighbor node, a node configuration associated with the aperiodic PRSs, wherein at least one of the terminal configuration or the node configuration associated with each of the aperiodic PRSs comprises at least one of a trigger state identification, ID, frequency layer ID, or node ID information, wherein the wireless terminal receives at least one of the aperiodic PRSs based on a downlink control information (DCI) of triggering the at least one of the aperiodic PRSs received from the serving node and the terminal configuration, wherein the at least one of the aperiodic PRSs is received within at least one measurement gap in at least one measurement gap repetition period, and wherein a time gap between a time of receiving the DCI and a time associated with the earliest PRS of the at least one of the aperiodic PRSs triggered by the DCI is greater than or equal to a threshold, wherein the time associated with the earliest one of the at least one of the aperiodic PRSs triggered by the DCI is selected, based on a capability of the wireless terminal, from one of a starting time of a measurement gap in which the earliest PRS of the at least one of the aperiodic PRSs triggered by the DCI is located or a time of receiving the earliest PRS of the at least one of the aperiodic PRSs triggered by the DCI.

8. The wireless communication method of claim 7, wherein the terminal configuration: is transmitted via the serving node of the wireless terminal, or is transparent to the serving node.

9. The wireless communication method of claim 7, further comprising:

receiving, from the wireless terminal, a request command for the aperiodic PRS;

transmitting, to the serving node of the wireless terminal, information associated with at least one of the aperiodic PRSs for the wireless terminal; or transmitting, to the serving node, a request command for the aperiodic PRS;

wherein the request command comprises at least one of frequency information of the aperiodic PRS, node ID information, periodicity information indicating the aperiodic PRS or beam information of the aperiodic PRS.

10. A wireless communication method for use in a serving node, the wireless communication method comprising:

receiving, from a network entity, a node configuration associated with aperiodic positioning reference signals (PRSs), wherein the node configuration associated with each of the aperiodic PRS comprises at least one of a trigger state identification, ID, frequency layer ID, or node ID information;

transmitting, to a wireless terminal, downlink control information (DCI) of triggering at least one of the aperiodic PRSs; and transmitting the at least one of the aperiodic PRSs based on the DCI, wherein the at least one of the aperiodic PRSs is received within at least one measurement gap in at least one measurement gap repetition period, and wherein a time gap between a time of receiving the DCI and a time associated with the earliest PRS of the at least one of the aperiodic PRSs triggered by the DCI is greater than or equal to a threshold, wherein the time associated with the earliest one of the at least one of the aperiodic PRSs triggered by the DCI is selected, based on a capability of the wireless terminal, from one of a starting time of a measurement gap in which the earliest PRS of the at least one of the aperiodic PRSs triggered by the DCI is located or a time of receiving the earliest PRS of the at least one of the aperiodic PRSs triggered by the DCI.

11. The wireless communication method of claim 10, wherein the DCI comprises a field of triggering the at least one of the aperiodic PRSs, wherein the field indicates at least one of trigger state ID information, frequency layer ID information, node ID information, resource set ID information, resource ID information, transmission offset information, path loss reference information or quasi-co-location information.

12. The wireless communication method of claim 10, further comprising:

receiving, from the network entity, a terminal configuration of the aperiodic PRSs associated with the wireless terminal; and transmitting, to the wireless terminal, the terminal configuration, wherein the terminal configuration is transparent to the serving node.

13. The wireless communication method of claim 12, further comprising:

receiving, from the wireless terminal or the network entity, a request command for the aperiodic PRS, wherein the request command comprises at least one of frequency information of the aperiodic PRS, node ID information, periodicity information indicating the aperiodic PRS or beam information of the aperiodic PRS.

14. The wireless communication method of claim 12, further comprising:

receiving, from the network entity, information associated with the at least one of the aperiodic PRSs.

15. The wireless communication method of claim 10, further comprising:

transmitting, to at least one neighbor node, information associated with at least one PRS transmitted by the at least one neighbor node out of the at least one of the aperiodic PRSs.

16. A wireless terminal, comprising:

a communication unit and a processor configured to perform a wireless communication method of claim 1.

17. A network entity, comprising:

a communication unit and a processor configured to perform a wireless communication method of claim 7.

18. A serving node, comprising:

a communication unit and a processor configured to perform a wireless communication method of claim 10.

* * * * *